United States Patent
Ranzau et al.

(10) Patent No.: US 6,461,723 B1
(45) Date of Patent: Oct. 8, 2002

(54) CELLULAR RUBBER PROFILE, PARTICULARLY SEALING PROFILE FOR THE SEALING OF TWO COMPONENTS WHICH COOPERATE WITH ONE ANOTHER

(75) Inventors: Heiko Ranzau; Karin Schaper, both of Bockenem (DE)

(73) Assignee: Meteor Gummiwerke K.H. Bädje GmbH & Co., Bockenem (DE)

(*) Notice: Subject to any disclaimer, the term of this patent is extended or adjusted under 35 U.S.C. 154(b) by 0 days.

(21) Appl. No.: 09/485,422

(22) PCT Filed: May 29, 1999

(86) PCT No.: PCT/EP99/03736

§ 371 (c)(1),
(2), (4) Date: Feb. 10, 2000

(87) PCT Pub. No.: WO99/66233

PCT Pub. Date: Dec. 23, 1999

(30) Foreign Application Priority Data

Jun. 15, 1998 (DE) .................................. 298 10 707 U

(51) Int. Cl.[7] .................................................. B32B 3/26
(52) U.S. Cl. .............................. 428/304.4; 428/319.9
(58) Field of Search .......................... 428/158, 304.4, 428/319.7, 319.9; 49/497

(56) References Cited

U.S. PATENT DOCUMENTS

| | | | |
|---|---|---|---|
| 3,931,380 A | * 1/1976 | Belivakici et al. | |
| 4,513,044 A | 4/1985 | Shigeki et al. | 428/122 |
| 4,525,953 A | * 7/1985 | Stutzman | |
| 4,998,946 A | 3/1991 | Nozaki | 49/497 |
| 5,085,006 A | * 2/1992 | Hayashi et al. | |
| 5,087,488 A | 2/1992 | Cakmakci | 428/31 |
| 5,355,628 A | * 10/1994 | Dranchak | |
| 5,564,249 A | * 10/1996 | Borys et al. | |
| 5,736,215 A | * 4/1998 | Buchholz et al. | |
| 5,847,052 A | * 12/1998 | Hamanaka et al. | |

FOREIGN PATENT DOCUMENTS

| | | |
|---|---|---|
| DE | 91 06 181.4 | 7/1991 |
| GB | 1 545 511 | 5/1979 |

OTHER PUBLICATIONS

"Elastomer–Dichtsysteme in Kraftfahrzeug–Karosserien", by Alistair Hill, Günter Kirchmann and Hans–Volker Buchholz, Sonderdruck aus Kautschuk + Gummi • Kunstoffe, 1/91.

* cited by examiner

Primary Examiner—M. Alexandra Elve
Assistant Examiner—Jonathan Johnson
(74) Attorney, Agent, or Firm—Synnestvedt & Lechner LLP

(57) ABSTRACT

A cellular rubber profile for the sealing of two components which cooperate with one another is disclosed. The profile has a black base structure and a non-black overlay structure which is co-extruded with the base structure. The overlay structure overlies the base structure in the manner of a cap. Opposite the overlay structure the profile has a foot portion with lateral protuberances.

8 Claims, 1 Drawing Sheet

Figure 1:
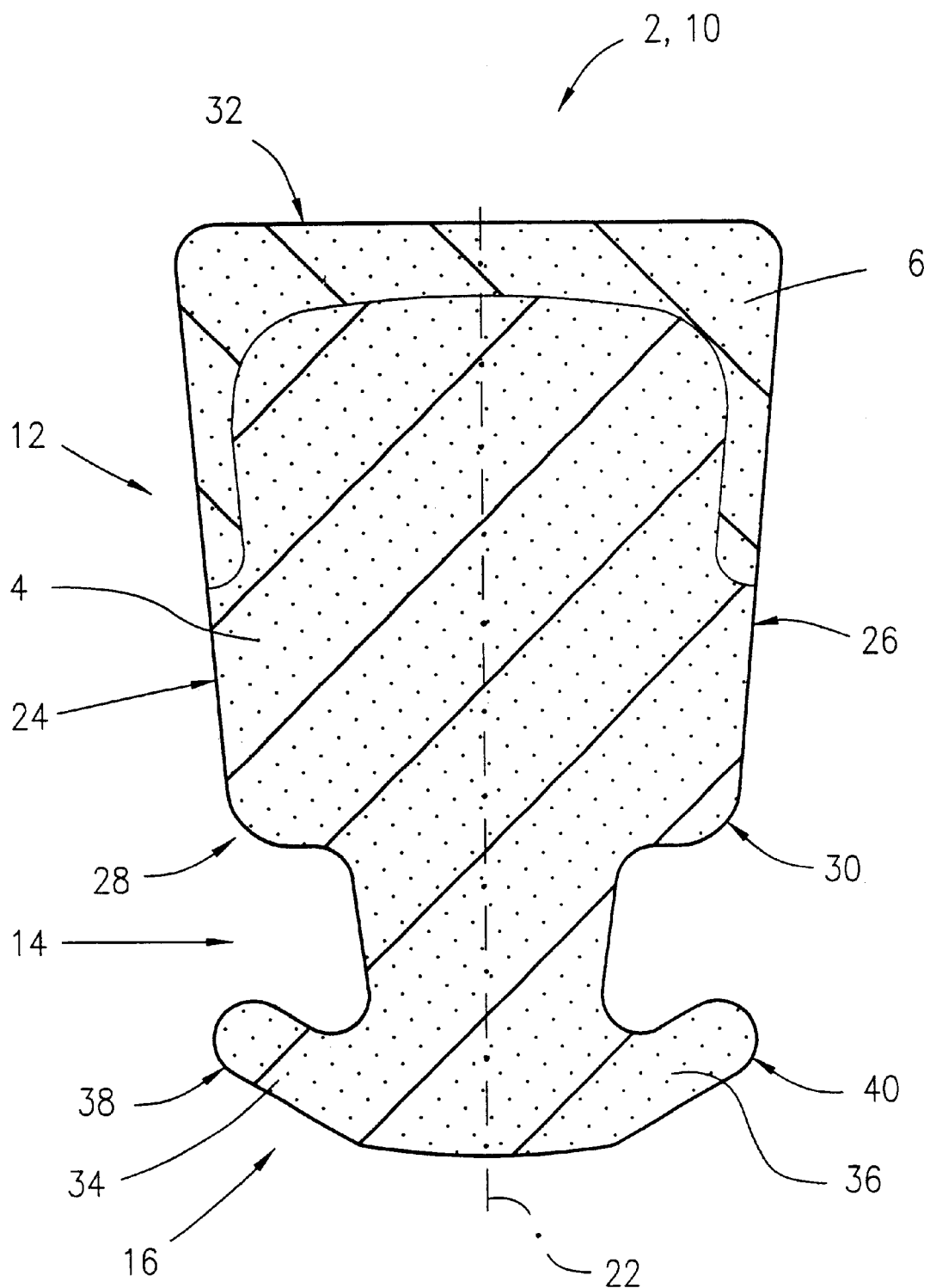

CELLULAR RUBBER PROFILE, PARTICULARLY SEALING PROFILE FOR THE SEALING OF TWO COMPONENTS WHICH COOPERATE WITH ONE ANOTHER

FIELD OF THE INVENTION

The invention relates to a cellular rubber profile, and particularly to a sealing profile for the sealing of two components which butt against one another.

BACKGROUND OF THE INVENTION

From the practice which is described in the journal "Kautschuk+Gummi Kunststoffe" (Dr. Alfred Hufthig Verlag GmbH, Heidelberg, Germany) No. 1/91, article entitled "Elastomer-sealing systems in motor vehicle bodywork", paragraph 5.1.3, it is known, for the sealing of diffusion plates relative to a lamp housing to use black cellular rubber sealing cords which are trapezoidal, oval or round in cross-section and which are assembled into a ring from an EPDM extrusion profile. In addition to this, cellular rubber profiles are used in a multiplicity of ways, inter alia as buffers for abutting edges. In practice, such black cellular rubber profiles are frequently perceived to be aesthetically annoying.

One such cellular rubber profile is known from DE 91 06 181 U1. It consists throughout of the same (black) cellular rubber and comprises a profile foot, a main portion, a profile head and two hollow chambers extending therethrough. The semicircular profile head is provided with continuous sealing ribs which extend radially outwards when the profile head is unstressed.

From GB 1 545 511A, FIG. 10, it is known per se to apply, by coextrusion, a thin, differently colored covering layer of very expensive PVC/nitrile polymer or HYPALON (R.T.M.) polymer to the free outer surface of a trim profile which is U-shaped in cross-section and made from inexpensive EPDM or similar polymers with up to 60% fillers and embedded reinforcement. From one limb of the trim profile can extend a tubular sealing profile which can consist for example of closed cell sponge rubber and which after its vulcanization must be fixed to the trim profile in a separate manufacturing step.

From U.S. Pat. No. 4,513,044, FIGS. 3 and 4, it is known per se to coextrude a trim profile which is U-shaped in cross-section and of black solid rubber, a tubular sealing profile of black sponge rubber extending from one limb of the trim profile, and a layer of differently colored solid rubber overlying a part of the outer surface of the trim profile and of the sealing profile.

U.S. Pat. No. 5,087,488 shows as known per se a trim strip which is coextruded from a basic material of a first, cheap thermoplastic material, such as PVC or PE for example, and a differently colored covering layer of a second, more expensive thermoplastic material, for example PP.

It is the object of the invention to provide an aesthetically attractive cellular rubber profile which also fulfills its technical functions reliably, i.e. for example sealing or shock-absorbing.

This object is achieved in accordance with the invention by a cellular rubber profile comprising a black base structure and a non-black overlay structure co-extruded with the base structure.

SUMMARY OF THE INVENTION

According to the invention, a cellular rubber profile is provided which is coextruded as a duplex profile such that it has a black base structure and a non-black overlay structure which is formed in one piece with the base structure. While the black base structure defines the profile in terms of its basic technical functions, the non-black overlay structure, which can be standardized for example according to RAL colors, is decisive in terms of the aesthetic appearance of the cellular rubber profile. In this connection, it is particularly to be noted that the carbon black particles used for the manufacture of black cellular rubber are very extensively researched in terms of their performance in cellular rubber, and consequently are reliably controllable with good availability and low cost. Colored particles on the other hand do not furnish the desired technical properties and in addition are comparatively expensive.

Preferably, the average thickness of the layer of the overlay structure amounts to 1.0 mm to 3.0 mm, particularly 1.5 mm. With a layer of such thickness, the compression properties of the complete cellular rubber profile in the depth direction of the cellular rubber profile are only changed to a trifling extent, so that the cellular rubber profile behaves virtually in the same way as the known black cellular rubber profiles, although it comprises an attractive colored overlay structure, for example cream-white, for use in headlamp housings.

Preferably, the cellular rubber profile is constructed in the manner of a sealing profile and comprises a sealing portion and a foot portion provided with lateral retaining surfaces on the side which lies opposite to the sealing surface and which is connected to the sealing portion by way of a yieldingly flexible linking portion. This construction permits the sealing profile on the one hand to be mounted and retained in an optimum manner and on the other hand gives optimum sealing, since the yieldingly flexible linking portion prevents dimensions and settings chosen for the sealing function from having a negative effect on the mounting and retention of the profile. While it is unfavorable, for the sealing function, strongly to compress the sealing rubber in the fitting of the profile into a mounting groove of a lamp housing, it is nevertheless necessary for the retaining function to achieve, at least regionally, a high retaining force by means of a large compression. In this connection it has proved to be particularly advantageous that the basic structure, which comprises the foot portion, the linking portion and a large part of the sealing portion, is black and consequently can be implemented with good mechanical properties.

The yieldingly flexible linking portion additionally has the advantage that the sealing surface which faces the closure glass does not tilt if for example the mounting groove characterized as a sealing bed is finished off in an irregular or non-uniform manner. The yieldingly flexible linking portion offers the possibility that the sealing portion matches itself well both to the sealing bed and to the closure glass without at the same time having to sacrifice a reliable retention of the profile. With the use of the sealing profile according to the invention with complex geometrical structures, which can have sections running away from the plane of the closure glass, an adhesive is no longer necessary. Thus, not only is the cost of fitting reduced, but it also facilitates a subsequent recycling according to type. There is no danger that the sealing profile could fall out of the sealing bed.

Preferably, the foot portion of the sealing profile comprises at least one resilient retaining strip with a retaining protuberance which projects, in the unmounted state, laterally beyond the plane of the corresponding contact surface of the sealing portion of the sealing profile. This resilient retaining strip, upon mounting, is more strongly compressed than the sealing portion, so that a high retaining force is achieved. The resilient retaining strip should be so formed that in the event of a tensile force which is so directed that it tends to pull the sealing profile from the sealing bed, a withdrawal of the sealing profile would only be possible by doubling the resilient retaining strip over.

Preferably, the foot portion is formed to be substantially symmetrical in relation to the central plane which extends in the direction of the length of the profile and transversely to the sealing surface. Thus, the mounting is facilitated, since a control of the profile on its lengthwise orientation becomes superfluous.

The mounting is facilitated if the lateral contact surfaces have an inclination to the central plane of 2° to 10°, preferably 4°, more than the angle of the corresponding wall sections of the mounting groove relative to its central plane, and if the end regions of the sealing portion adjacent to the foot have a smaller width than the spacing of the corresponding, opposing wall sections of the mounting groove. With such a dimensioning, the sealing profile can easily be pushed into the mounting groove right up to the base, even if manufacturing tolerances and unevenness of the mounting groove are present. Thanks to the strong inclination of the lateral contact surfaces of the sealing portion virtually self-fitting into the sealing profile. In addition to this, a compensation volume is made available, so that the sealing portion, as compared with known sealing cords, has a small pre-deformation and consequently better sealing properties after its fitting into the mounting groove.

In order to ensure a good sealing effect, the sealing portion should have a width in comparison with the width of the mounting groove in the region of the contact surfaces which is less than 20% greater, preferably less than 10% greater, than the width of the mounting groove in this region. Thus, there is maintained a high capacity for deformation of the sealing profile in the region of the sealing portion.

In order to protect against the infiltration of moisture, according to a preferred embodiment of the invention, the foot portion has a sealing nose on the side which lies opposite the sealing surface. This sealing nose should be formed as a rib with side walls inclined to the central plane and with a rounded hump, so that a deformation of the sealing nose is easily possible and therefore manufacturing tolerances in the bottom of the mounting groove do not have a negative effect on the position of the sealing surface which faces the closure glass.

Further advantageous embodiments and developments of the invention are set out in the subsidiary claims, as well as being shown in the accompanying drawing in conjunction with the following description. In the drawing:

FIG. 1 is a cross-section through a preferred embodiment of a cellular rubber profile in accordance with the invention.

DETAILED DESCRIPTION OF THE PREFERRED EMBODIMENT

The cellular rubber profile 2 shown in FIG. 1 is coextruded as a duplex strand profile and comprises a base structure 4 of black cellular rubber as well as an overlay structure 6 of cellular rubber which is colored cream-white. The cellular rubber profile 2 is formed as a sealing profile 10 having a sealing portion 12, a linking portion 14 and a foot portion 16.

The sealing portion 12 is so shaped that it has a depth of about 65% of the depth of the complete sealing profile 10 in the cross-section taken along the center plane 22 of the sealing profile 10. Lateral contact surfaces 24, 26 of the sealing portion have an angle of inclination relative to the center plane 22 of from about 5°. By this means and by rounded shoulders 28, 30 in the transition zone from the sealing portion 12 to the linking portion 14, a fitting into place of the sealing portion 12 during the mounting of the sealing profile 10 is facilitated and a tilting of the sealing surface 32 is substantially prevented. The layer thickness of the overlay structure 6 amounts to 1.2 mm in the region of the center plane and increases slightly towards the edges.

Annexed to the sealing portion 12 at the end thereof which lies opposite the sealing surface 32 is the linking portion 14. The linking portion represents a narrowing which makes it much less in width than the width of a mounting groove. At its narrowest place the linking portion 14 has a width which corresponds to only about 38% of the maximum width of the sealing portion 12. Therefore, the linking portion is yieldingly flexible, so that the position of the foot portion 16 which is annexed to the linking portion 14 remains without any influence on the position of the sealing portion 12.

The foot portion 16 has a width which is greater by 100% than that of the linking portion 14 in the cross-section perpendicular to the center plane 22. Protuberances 34, 36 of the foot portion 16 are formed as resilient anchor strips permitting, at least partially, a tilting movement. Thus, lateral retaining surfaces 38, 40 come into contact with the mounting groove so that a withdrawal of the sealing profile 10 from the mounting groove would only be possible by doubling over the lateral protuberances 34, 36.

What is claimed is:

1. A cellular rubber profile comprising a black base structure and a non-black overlay structure co-extruded with the base structure, wherein the base structure and the overlay structure are formed in the manner of a sealing profile for the sealing of two components which cooperate with one another, and wherein the overlay structure overlies the base structure in the manner of a cap.

2. A cellular rubber profile according to claim 1, wherein the overlay structure has an average thickness between about 1.0 mm and about 3.0 mm.

3. A cellular rubber profile according to claim 1, wherein the overlay structure has an average thickness of about 1.5 mm.

4. A cellular rubber profile according to claim 1, wherein said two components comprise a lamp housing which cooperates with a closure glass.

5. A cellular rubber profile according to claim 1, wherein the base structure has a hardness of 10 to 25 on the Shore A scale.

6. A cellular rubber profile according to claim 1, wherein the base structure has a hardness of about 20 on the Shore A scale.

7. A cellular rubber profile according to claim 1, wherein the base structure and the overlay structure each have a mixed-cell pore structure with a closed skin.

8. A cellular rubber profile according to claim 7, wherein the pores of the overlay structure have an average pore size which is relatively smaller than the average pore size of the pores of the base structure.

* * * * *